United States Patent [19]

Dann et al.

[11] Patent Number: 5,128,186

[45] Date of Patent: Jul. 7, 1992

[54] SCREENING IMPLEMENT USED IN REPAIR AND MANUFACTURE OF SCREENS

[75] Inventors: Simon Dann; Klaus Tomantschger, both of Ontario, Canada

[73] Assignee: Ravenswood Inc., Toronto, Canada

[21] Appl. No.: 583,091

[22] Filed: Sep. 17, 1990

[51] Int. Cl.$^5$ .............................................. B32R 3/00
[52] U.S. Cl. ..................................... 428/40; 428/209; 428/332
[58] Field of Search .......................... 428/40, 209, 332

[56] References Cited

U.S. PATENT DOCUMENTS

| | | | |
|---|---|---|---|
| 3,049,836 | 8/1962 | Weissman | 428/40 |
| 4,135,017 | 1/1979 | Hoffmann, Sr. | 428/78 |
| 4,666,751 | 5/1987 | Pasquali et al. | 428/40 |
| 4,707,391 | 11/1987 | Hoffmann, Sr. | 428/63 |

FOREIGN PATENT DOCUMENTS 1230097  4/1971  United Kingdom .................. 428/40

*Primary Examiner*—Patrick J. Ryan
*Assistant Examiner*—Kam F. Lee

[57] ABSTRACT

A screening implement used in repairing or mounting screens comprising a substantially planar substrate having on at least one side a coating of an adhesive having a peel force exceeding 50 grams/cm width as determined in the 180 degree peel adhesion test, a low water sensitivity thereby being suitable for weather or marine exposures, a high thermal stability over a temperature range from −60 to +60 degrees C., and means for creating a bond between said adhesive and a screen, said bond having a durability of not less than 6 months.

A method for repairing defective screens whereby a screening implement as described above is affixed to replace a defective section of a screen removed from the screen. The screening implement may be covered by a releasable liner sheet. In use the releasable liner sheet is removed from the screening implement and the screening implement is affixed to a screen by the exposed adhesive.

The adhesive screening implement can be made from a continuous strip and custom cut just before application, or can be precut to conform to a variety of designs and sizes.

8 Claims, No Drawings

SCREENING IMPLEMENT USED IN REPAIR AND MANUFACTURE OF SCREENS

BACKGROUND OF THE INVENTION

1. Field of the Invention

This invention relates to repairing screens of windows and doors and the like of buildings, tents, as well as automotive and marine vehicles. It also relates to the manufacture of window screens.

2. Description of the Prior Art

At present, the conventional way to effect screen repairs is to replace the entire framed screen section. Screen repairs involving replacement of the defective screen is both time consuming and costly, and a contractor with special tools may be required to effect this type of repair. To repair small tears, holes or other defects in screens, no means other than to manually sew or cover the defect with a solid material is currently available.

The inventors know of no effective prior art relating to the use of screens coated with adhesives for use as a sectional screen repair or screen repair patch, as well as for the purpose of attaching screens to frames thereby obviating the need for screen molding.

U.S. Pat. Nos. 4,792,473 (Vitale) and 3,391,037 (McNulty) disclose related prior art. The Vitale apparatus describes a self adhesive wallboard tape particularly for use for covering joints in interior wall construction where the substrate is typically a solid layer and may optionally contain a number of spaced holes or be a screen material. The adhesive applied on the perforated tape or optional screen maintains the position of the tape while the plaster is applied and finds use in joining two pieces of drywall on both flat and angular surfaces. Other than high initial tack and long term peeling resistance, the adhesive has no specific requirements regarding curing, aging, life and appearance. The tape is essentially paper or other forms of cellulose which is bonded to the paper surface of the wallboards to be joined and does not require transparency. Holes are provided to merely permit penetration of plaster for added strength.

The McNulty patent describes the application of an open fiberglass material with an adhesive coating on the edges to seal the seams between the sections of wallboards. Again, the objective is to provide means for covering joints in interior wall construction whereby the same quality finishing is achieved less labour intensively than the regular method of bonding paper tape with gypsum compound, drying, sanding and reapplying the gypsum.

A self adhesive wall repair fabric similar to the one described by the McNulty patent is available in rolls from Baymills, Oakville, Ontario under the tradenames FibaTape and Crackstop ™. These products apply a woven fiberglass screen with a low peel adhesion and low tack without a release liner. The purpose of this product is to repair holes and cracks in walls. The adhesive attachs the screen to the area to be repaired until the wall repair compound is applied. The adhesive exhibits the required adhesion to maintain the position of the screen however, it can be removed and repositioned quite easily, which is a desired feature in this particular application, as no curing or permanent adhesion is required by the adhesive. It is not designed for exterior use nor to withstand weather extremes in its native state. The bond to the underlying drywall is provided by the plaster or gypsum compound used to repair the crack or the hole. The self adhesive tape eliminates the need for pasting or stapling to maintain the position of the mesh while the gypsum compound is applied initially. It is recommended that the FibaTape be applied in a cross hatch manner so the entire area to be repaired is covered by at least two layers. The mesh size is selected sufficiently large to permit the gypsum compound to penetrate easily through the mesh upon application without any distortion or deformation of the mesh. For effective use and life, it is required that the FibaTape be covered by the gypsum compound.

Prior art summary shows tape materials designed for applications in environmentally protected areas and intended for use as underlayment and bridging prior to covering the gypsum compound.

SUMMARY OF THE INVENTION

It is an object of the present invention to provide a self adhesive screen for applications requiring a strong and durable contact and a permanent bond between screens; between screens and windows between screens and other surfaces requiring a high degree of transparency.

It is a further object of the invention to provide an adhesive coating on one side of the screen which is substantially transparent. It is an object of the invention to provide a screening implement for use in repairing screens. It is a further object of the invention to provide methods for screen repair and manufacture.

In the invention a coating of adhesive may optionally be applied to the surface of a substrate comprising a solid or perforated sheet or screen of metal, fiberglass, plastic or the like, leaving any centre perforations in a screen substantially adhesive free to maintain air flow through the material, similar to the air flow obtained with virgin screen material. For screen composites where a screen is bonded to a flat surface, the screen may either be affixed to a continuous adhesive foil or the adhesive composition may cover only the strands of the screen.

In applications requiring a bond between screens it may be desirable to apply the adhesive in a continuous, uninterrupted layer onto at least the outer frame of the screen patch to eliminate the need for alignment between the screen patch and the section of screen to be repaired as any misalignment of the screens would fail to generate an adequate bond between the two screens.

The use of continuous adhesive coatings is desired for applications where the screen to screen contact area does not provide a sufficiently large contact area for good bonding between the screen and the substrate.

The preferred form of the invention obviates the need for the replacement of damaged screens by novel affixing of a self-adhesive screen composite to the screen. In the preferred embodiment, the base member of the self-adhesive screen composite need not necessarily be completely transparent in material or completely perforated in structure, depending upon the particular intended use. In the preferred embodiment, there is provided a self-adhesive screen composite at least partially coated with at least one adhesive composition having the following characteristics:

high tack
good adhesive strength
bondable at room temperature
practical curing at room temperature
excellent resistance to peel and cleavage resistance to stresses caused by thermal shock over a temperature range from −60 to +60 degrees C.
resistance to humidity, solvents
on line dispensable
long life
little or no discolouration with aging
good release from liner (in instances where a liner is applied)
reasonable cost
non toxic and environmentally benign Adhesives found suitable for this invention and providing a high bonding strength, even in small contact areas, include but are not limited to hot melt adhesives, silicone adhesives, natural rubber adhesives, acrylic adhesives, pressure sensitive adhesives, two component epoxies, polyesters and single component medium-high viscosity contact adhesives.

Examples of applications for this invention include but are not limited to screen patches, decorative window screens, privacy window screens (i.e., customized cars, recreational vehicles, tents, and windows where view from the outside needs to be obstructed, windows where decorative patterns are desired).

Further features of the invention will be described or will become apparent in the course of the following detailed description.

DETAILED DESCRIPTION OF THE PREFERRED EMBODIMENT

In the preferred embodiment of the invention, a screening implement used in repairing or installing screens, the substantially planar substrate is provided in the form of a first screen having on at least one side a coating of an adhesive. The adhesive requires a tack of at least 100 grams (as determined in the Polyken Tack Test using a 0.5 cm. diameter stainless steel probe, 100 g/cm2 contact pressure, 1 second contact time and a 1 cm/sec separation rate at room temperature), a peel force exceeding 50 g/cm width (as determined in the 180 degree peel adhesion test on a stainless steel plate with the driven jaw running at 0.5 cm/sec (peel rate 0.25 cm/sec) according to ASTM 01000-66 at room temperature), a low water sensitivity thereby being suitable for weather or marine exposures, a high thermal stability over a temperature range from −60 to +60 degrees C., and means for creating a bond between said adhesive and a second screen, said bond having a durability of not less than 6 months. The adhesive coating has a thickness from 0.001 to 1 mm and is preferably immune to microbial and insect attacks.

Also the screening implement of the preferred embodiment of the invention, further comprises releasable liner means covering at least partially a first side of the first screen. In use, the releasable liner sheet is removed from the screen and the first screen is affixed to a second screen by the exposed adhesive. Adhesion of the screening implement to a second screen is maximized by providing an adhesive coating which is bondable and curable at room temperature, having a high tack, good cohesive and adhesive strength with resistance to stresses caused by thermal shock over a temperature range from −60 to +60 degrees C. and resistance to peel and cleavage, humidity, and solvents.

In another form of use the screening implement, two screening implement patches can be used to coat partially transparent structures, from both sides, in a sandwich type fashion.

The screening implement can be made from a continuous strip and custom cut just before application, or can be precut to conform to a variety of designs and sizes.

The adhesive may be applied to the base member in various manners. In applications where the substrate is a screen material and only coverage of the mesh by the adhesive is desired, adhesive screen printing application equipment (i.e. Microprint as supplied by Graco/LTI) can be used. Other techniques involve the use of print wheels and print rolls to lay down engraved patterns. A one sided coating of the screen (in which the centre of the screen can be adhesive free or covered by an adhesive film) can be obtained by spray application of the adhesive onto a screen which is transported by use of rollers or by use of ribbon coating equipment.

In yet another production technique, an applicator head located on the screen and positioned in between the feeder roll and the product roll can be used to dispense the adhesive onto the screen. In the case of screen patches or in other applications where it is desireable to coat particular patterns with the adhesive and leave other portions of the screen adhesive free, microprocessor controlled applicator heads can be utilized as well as the before mentioned adhesive applications equipment.

Another method is to guide the screen from the feeder roll through essentially an adhesive bath equivalent to a dipping process during which the entire screen surface can be coated with adhesive. Web coating equipment can be utilized to apply the adhesive to merely one side of the substrate.

In all applications, the screening implement can be processed into a roll so that various shapes and sizes of patches can be stamped out. In addition, in all cases the screening implement may optionally have releasable liner means attached to a first side of the substrate.

The exposed surface of the adhesive composition may be cast in film means having a pattern imprinted thereon. Where the adhesive is applied to mesh strands of a screen substrate of a first colour the adhesive may be overprinted with discrete areas of an ink of a second colour and other colours. The fineness of the coloured spots and the integration reaction of the human eye result in sensing the open mesh member as having the overall colour of the applied inks.

The following specific examples demonstrate various aspects of the present invention, however, it is to be understood that these examples are for illustrative purposes only and do not purport to be wholly definitive as to conditions and scope.

EXAMPLE 1

A repair patch for use on an insect screen is prepared by cutting a patch 3" by 3" from a fibreglass screen and having 16 meshes per inch extending into both directions. A pressure sensitive tape is applied on one side around the outer periphery of the patch over a width of 1". The pressure sensitive adhesive used was a Scotch Y-9473 TM adhesive transfer tape containing a 0.25 mm thick Isotac pressure sensitive adhesive manufactured by 3M. Upon application of the patch, the release liner is removed and the patch attached to the insect screen by applying slight pressure.

EXAMPLE 2

A roll of fibreglass mesh of 6" width is processed applying a silicone based pressure sensitive adhesive (X2-7769 adhesive, provided by Dow Corning) with a release liner applied to one side of the screen over its entire area (by using laminating equipment) all of which fed simultaneously from a roll of fibreglass and a roll of silicone adhesive containing the release liner.

A similar finish could be obtained using Permatrans TM IP-2100, a double-coated adhesive film and Permaguard TM IP-7000 and IP-7500, both being adhesive coated clear films which offer abrasion resistance in indoor and outdoor applications. Two 3" by 3" patches are stamped out and applied to a punctured door insect screen sandwiching the defective screen between the two patches. Six months after application of the screen patches, no deterioration was noted. In another instance, these films may be "pre-printed" with a specific pattern so as to resemble or duplicate the pattern of the substrate to which they are applied.

EXAMPLE 3

A roll of mesh and a suitable hot melt are fed into a die and the adhesive is applied onto the substrate in a fashion similar to the method(s) used in screen printing. To limit the application of the adhesive to the surface of the mesh, the roll adjacent to the mesh may contain a grid pattern of identical spacing and thus cover the openings in the mesh, while the adhesive is applied, thereby limiting the coverage of the adhesive to the mesh strands. A decorative screen for use on a recreational vehicle is prepared in this fashion and attached to the vehicle window.

EXAMPLE 4

A pressure sensitive adhesive such as Dow Corning X2-7769 is applied to a clear plastic sheet of 0.25 mm thickness. The clear plastic sheet has been previously imprinted with the screen pattern so as to maintain the overall screen appearance after application to the defective screen area. (Also noted in Example 2.)

EXAMPLE 5

A 0.5" wide layer of adhesive (Dow Corning X2-7769 adhesive) is applied around a 2' by 3' fibreglass screen and applied directly onto an aluminium frame to be used as an insect screen.

It will be appreciated that the above description relates to the preferred embodiment by way of example only. Many variations on the invention will be obvious to those knowledgeable in the field, and such obvious variations are within the scope of the invention as described and claimed, whether or not expressly described.

What is claimed as the invention is:

1. A screening implement used in repairing screens comprising a planar transparent substrate having on at least one side a coating of an adhesive having a peel force exceeding 50 grams/cm width as determined in the 180 degree peel adhesion test, a low water sensitivity thereby being suitable for weather or marine exposures, a high thermal stability over a temperature range from −60 to +60 degrees C., and means for creating a permanent bond between said adhesive and a screen, said bond having a durability of not less than 6 months.

2. A screening implement as recited in claim 1, said adhesive being a pressure-sensitive adhesive.

3. A screening implement as recited in claim 1, said substrate further comprising screening means.

4. A screening implement as recited in claim 1, said adhesive coating further comprising a layer having a thickness of 0.001 to 1 mm.

5. A screening implement as recited in claim 1, said adhesive coating being resistant to degradation caused by microbial and insect attacks.

6. A screening implement as recited in claim 1, further comprising an adhesive coating cast in film means said film means having a pattern imprinted thereon.

7. A screening implement as recited in claim 1, said substrate further comprising releasable liner means covering at least partially said adhesive coating.

8. A screening implement as recited in claim 1, said substrate comprising a material which is permeable to air.

* * * * *